United States Patent [19]

Massinger

[11] 4,282,442

[45] Aug. 4, 1981

[54] DEVICE FOR CONVERTING RECIPROCAL LINEAR MOTION TO CONTINUOUS ROTARY MOTION

[76] Inventor: Heinrich Massinger, 76 South St., Danbury, Conn. 06810

[21] Appl. No.: 56,538

[22] Filed: Jul. 11, 1979

[51] Int. Cl.³ .................. F16H 29/20; H02P 17/00
[52] U.S. Cl. ................................ 290/1 C; 74/812
[58] Field of Search ............ 290/42, 53, 1 C; 74/812; 60/507

[56] References Cited

U.S. PATENT DOCUMENTS

| | | | |
|---|---|---|---|
| 275,436 | 4/1883 | Tauber | 74/812 |
| 1,864,499 | 6/1932 | Grigsby | 290/42 X |
| 3,207,005 | 9/1965 | Geyer | 74/812 |
| 3,209,621 | 10/1965 | Laurent | 74/812 |
| 3,697,764 | 10/1972 | Stanziola et al. | 290/53 |
| 4,170,738 | 10/1979 | Smith | 290/42 |

*Primary Examiner*—J. V. Truhe
*Assistant Examiner*—Shelley Wade
*Attorney, Agent, or Firm*—Richard L. Miller

[57] ABSTRACT

A device for converting linear reciprocal motion to continuous rotary motion whereby both forward and backward power strokes of the reciprocal motion contribute to the power output of the device, the device including two one-way clutches, the first clutch engaging and the second clutch slipping during the forward stroke and the second clutch engaging and the first clutch slipping during the backward stroke so that the clutches transmit alternatively power to an output shaft, the output shaft being connected to a flywheel which stores energy and which reduces the magnitude of fluctuations in the rotational speed of the output shaft.

8 Claims, 6 Drawing Figures

DEVICE FOR CONVERTING RECIPROCAL LINEAR MOTION TO CONTINUOUS ROTARY MOTION

BACKGROUND OF THE INVENTION

1. Field of the Invention

The present invention relates to a device for converting reciprocal linear motion to continuous rotary motion. The device is particularly useful for converting reciprocal motion of a hydraulically actuated piston in a cylinder into rotary motion of an output shaft which drives an electric generator.

2. Description of the Prior Art

U.S. Pat. Nos. 2,578,559; 3,347,478; 3,465,602; 3,572,140 and 3,661,019 disclose devices for converting reciprocal motion to rotary motion or vice versa. U.S. Pat. No. 2,578,559 discloses a flywheel which is said to maintain a nearly constant rotational shaft velocity in a reciprocal to rotary conversion device having only one power stroke.

SUMMARY OF THE INVENTION

In a device in accordance with the present invention, the reciprocal linear motion of an input member is converted into alternating rotary motion of a drive member such as a drive shaft or a drive gear. A first one-way clutch connected to the drive member engages and transmits power from the drive member to an output shaft when the drive member rotates in a clockwise direction; the first clutch disengages and slips when the drive member is rotated in a counterclockwise direction. A second one-way clutch connected to the drive member engages and transmits power from the drive member to the output shaft when the drive member rotates in a counterclockwise direction; the second clutch disengages and slips when the drive member is rotated in a clockwise direction. The two clutches transmit power from both strokes of the alternating rotational motion of the drive member to the output shaft which rotates in a single direction. The device further includes a flywheel which is connected to the output shaft and which stores energy and reduces the magnitude of fluctuations in the rotational speed of the output shaft.

In one embodiment of the invention, the drive member comprises a drive shaft which rotates an alternating motion. Although the drive shaft may be rotated by various types of mechanisms for converting linear reciprocal motion to alternating rotary motion, it is preferred that the drive shaft have a helical groove in the surface thereof, the groove defining two boundary surfaces. A pin, moved in a linear reciprocating motion by the input member, rides in the helical groove and rotates the drive shaft in alternating directions. When the pin is moved in one direction, it contacts one of the boundary surfaces of the groove and rotates the shaft in one direction; when the direction of movement of the pin is reversed, it contacts the other boundary surface of the groove and rotates the shaft in an opposite direction. The conversion device includes two drive gears mounted via one-way clutches on the drive shaft. When the drive shaft is rotated in a first direction, one of the clutches engages and turns the associated drive gear and the other clutch disengages and slips with respect to the shaft; when the shaft is rotated in the other direction, the first clutch disengages and slips with respect to the shaft and the second clutch engages and turns the associated drive gear. The drive gears are connected by additional gearing to a driven shaft, the driven shaft having a flywheel mounted thereon to store energy and to reduce the magnitude of fluctuations in the rotational velocity of the driven shaft. One of the drive gears is connected via additional gearing to the output shaft which may be used to generate power or for other purposes.

In a second embodiment of the invention, the drive member is at least one, and, preferably two drive gears which rotate in an alternating motion. The alternating drive gears are mounted on an input shaft and are rotatable in an alternating motion with respect to the input shaft. Each drive gear includes a bore having two pins protruding radially inwardly therefrom, each pin being slideable within a helical groove the surface of the input shaft to rotate the drive gears. Each of the drive gears on the input shaft meshes with a driven gear which is mounted via a one-way clutch on a rotatable driven shaft. When the input shaft is moved in a linear motion in one direction, one clutch engages and rotates one driven shaft while the second clutch slips with respect to the other driven shaft; when the input shaft is moved linearly in the other direction, the first clutch disengages and slips and the second clutch engages. The driven shafts are connected to an output shaft which may be used to generate power. The output shaft is connected to a flywheel which stores energy and which reduces the magnitude of fluctuations in the rotational speed of the output shaft.

DETAILED DESCRIPTION OF THE INVENTION

Figure 1:
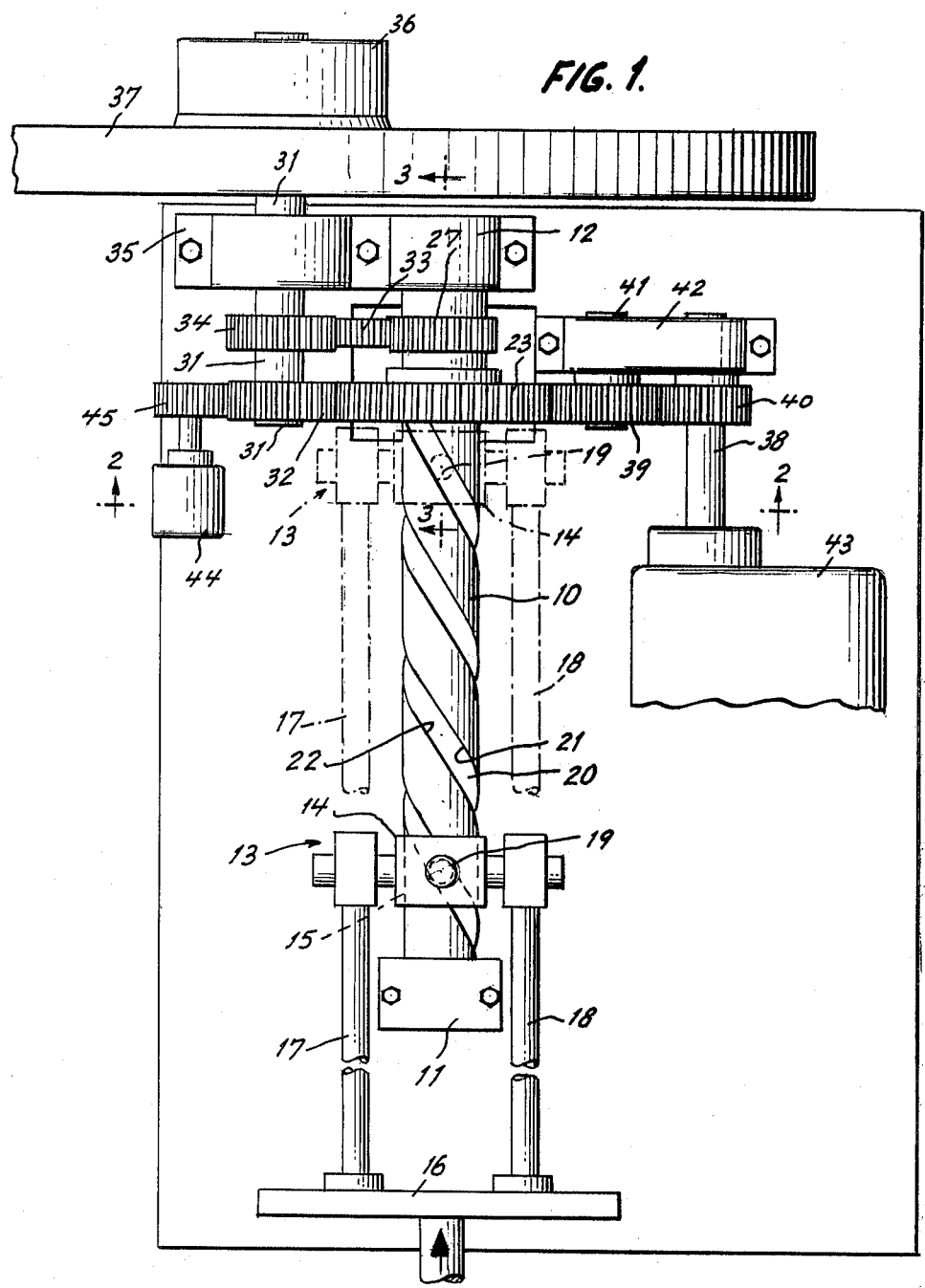
FIG. 1 is a plan view of one embodiment of a conversion device.
Figure 2:
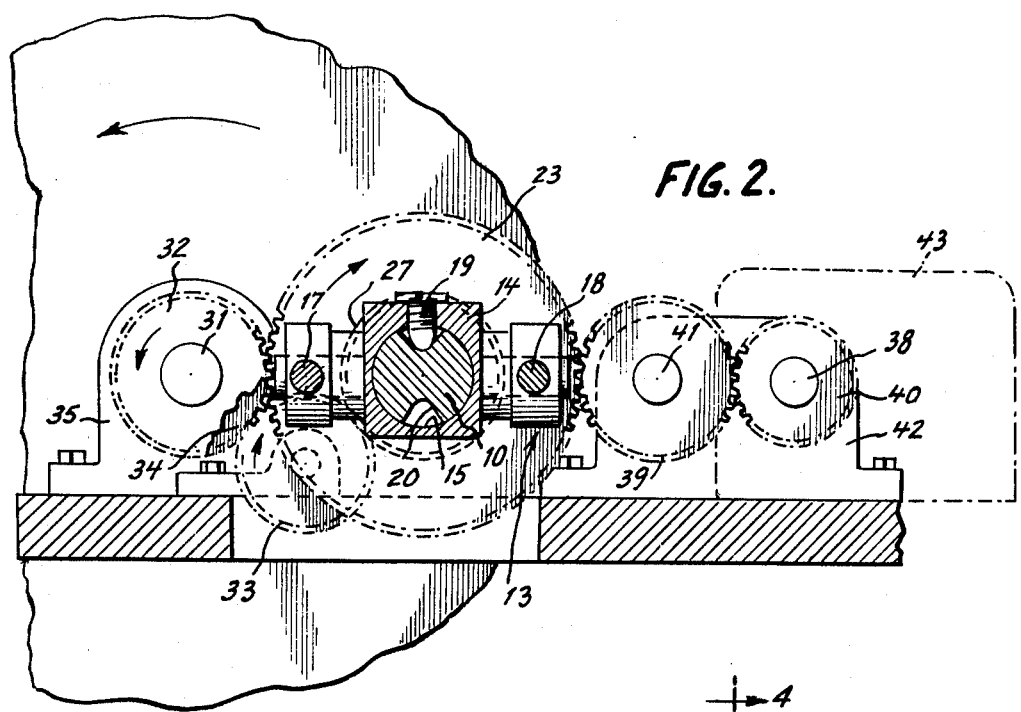
FIG. 2 is a sectional view along the line 2—2 of FIG. 1.
Figure 3:
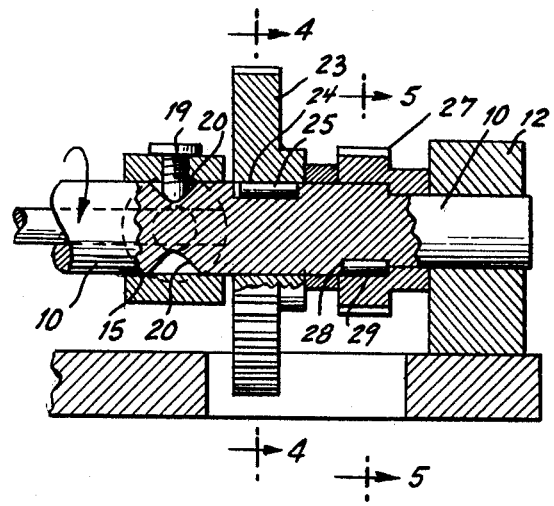
FIG. 3 is a sectional view along the line 3—3 of FIG. 1.

Referring to FIGS. 1 through 5, drive shaft 10 is rotatable in an alternating motion and has both ends rotatably mounted in thrust bearings 11 and 12. The thrust bearings are selected to withstand high axial and side pressures. The mechanism for rotating the shaft in an alternating motion will now be described. Input member 13 has a structure similar to a yoke and is movable in a linear reciprocal motion. The input member 13 is shown in a retracted position in solid lines in a forward position in phantom. Input member 13 includes a central body 14 having a bore 15 which receives drive shaft 10. Actuator 16 is connected to input member 13 by two elongated struts 17 and 18. Drive pin 19 protrudes from the interior of bore 15 and fits within a helical groove 20 on the surface of drive shaft 10. When input member 13 is moved forward, pin 19 engages one boundary wall 21 of the helical groove and turns drive shaft 10 in a clockwise direction. When input member 13 is moved backwards, pin 13 engages the opposite boundary wall 22 of helical groove 20 and rotates the drive shaft 10 in a counterclockwise direction. Although it has been found that the mechanism for rotating the drive shaft 10 in an alternating motion shown in FIGS. 1, 2 and 3 is particularly suitable for use in the device of the present invention, other types of mechanisms for converting linear reciprocal motion to alternating rotary motion of shaft 10 may be used.

Figure 4:
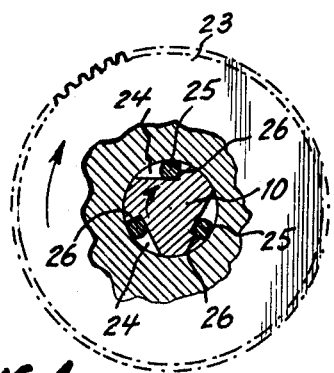
FIG. 4 is a sectional view along the line 4—4 of FIG. 3.
Figure 5:
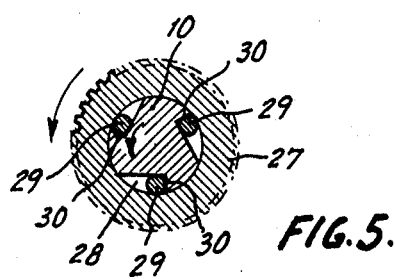
FIG. 5 is a sectional view along the line of 5—5 of FIG. 3.

Drive gear 23 is mounted on drive shaft 10 by use of a one-way clutch 24 which is best shown in FIG. 4. When the shaft is rotated in a clockwise direction as shown in FIG. 4, the pins 25 of clutch 24 engage surfaces 26 and rotate gear 23 in a clockwise direction. As shown in FIG. 5, a second drive gear 27 is mounted on drive shaft 10 by the use of a similar one-way clutch 28 which is operable in a direction opposite that of one-way clutch 24. When the drive shaft 10 is rotated in the clockwise direction, the pins 29 of clutch 28 disengage surfaces 30 and the drive gear 27 slips with respect to the drive shaft 10. Thus, clutch 24 transmits power from drive shaft 10 to gear 23 and clutch 28 disengages and slips when shaft 10 is rotated in a clockwise direction. When shaft 10 is rotated in a counterclockwise direction, clutch 24 disengages and slips with respect to drive shaft 10 and clutch 28 transmits power from drive shaft 10 to gear 27.

As shown in FIGS. 4 and 5, it is preferred that the clutches include 3 pins to provide for distribution of forces around the drive shaft. Alternatively, the clutches may be single pin clutches. It should be understood that various types of one-way clutches may be used, such as, for example, electric clutches or clutches having a structure different from that shown.

The drive gears 23 and 27 are connected to driven shaft 31 in a manner such that power is transmitted to driven shaft 31 during both the forward and backward strokes of reciprocal input member 13. More specifically, gear 23 meshes with driven gear 32 which is mounted directly on driven shaft 31. As drive gear 23 turns in a clockwise direction, driven gear 32 turns in a counterclockwise direction, thus turning driven shaft 31 in a counterclockwise direction. Drive gear 27 is connected to driven shaft 31 via intermediate gear 33 and driven gear 34 which is mounted on driven shaft 31. Thus, when drive gear 27 turns in a counterclockwise direction during the backward stroke of input member 13, drive gear 27 meshes with intermediate gear 33 to turn intermediate gear 33 in a clockwise direction; intermediate gear 33 meshes with driven gear 34 to rotate driven gear 34 in a counterclockwise direction.

Driven shaft 31 is rotatably mounted in bearings 35 and 36 which may be roller bearings. A flywheel 37 is mounted on the driven shaft 31 and turns in a counterclockwise direction with driven shaft 31. As the input member 13 is moved in a reciprocating motion, the power from the input member 13 rotates flywheel 37 which stores the energy from the reciprocating input member 13 in the form of inertial energy of the flywheel. The flywheel, when rotating, stabilizes the speed of driven shaft 31, which, in turn, provides for a relatively uniform speed of drive gear 23. In order to utilize the energy stored in the rotating flywheel 37 and the energy put into the conversion device by reciprocating input member 13, drive gear 23 is geared to an output shaft 38 by way of intermediate gear 39 and driven gear 40 which is mounted on power output shaft 38. Output shaft 38 and shaft 41 for intermediate gear 39 are mounted in bearings 42 and 43. In the embodiment shown in FIG. 1, output shaft 38 is connected to drive gear 23 via intermediate gear 39. Alternatively, output shaft 38 could be connected to drive gear 27 by suitable gearing.

The linear speed of input member 13 varies during its forward and backward strokes. At the retracted position of input member 13 as shown in solid lines, the input member is momentarily at rest. At points intermediate the retracted position and the forward position, input member 13 accelerates and deaccelerates. Since the rotational speed of drive shaft 10 is a function of the speed of input member 13, the rotational speed of drive shaft 10 varies, which, in turn, creates fluctuations in the rotational speed of gear 23, driven shaft 31 and output shaft 38. Flywheel 37, which stores energy during acceleration of the input member 13, feeds stored energy back to gear 23 when the rotational speed of drive shaft 10 falls below the rotational speed of gear 23. Thus, flywheel 13 reduces the magnitude of fluctuations in the rotational speed of drive gear 23 and output shaft 38.

As shown in FIG. 1, output shaft is connected to an electrical generator 43 and generates electricity. Thus, power from a reciprocal linear motion, such as that produced by a hydraulic cylinder and piston arrangement, may be used to power output shaft 38 and generate electricity. It should be understood that output shaft 38 may be used to power devices other than an electrical generator.

Referring to FIG. 1, the conversion device may optionally include a supplemental input motor 44 which is connected to gear 32 by input gear 45. Input motor 44 is used as a starter motor to begin rotation of the flywheel 37 when it is at rest. Moreover, input motor 44 may be used continuously during operation of the conversion device to reduce the magnitude of fluctuations in the speed of driven shaft 31. Supplemental input motor 44 may be powered by electricity from generator 43 so long as energy is being put into the conversion device via input member 13.

Figure 6:
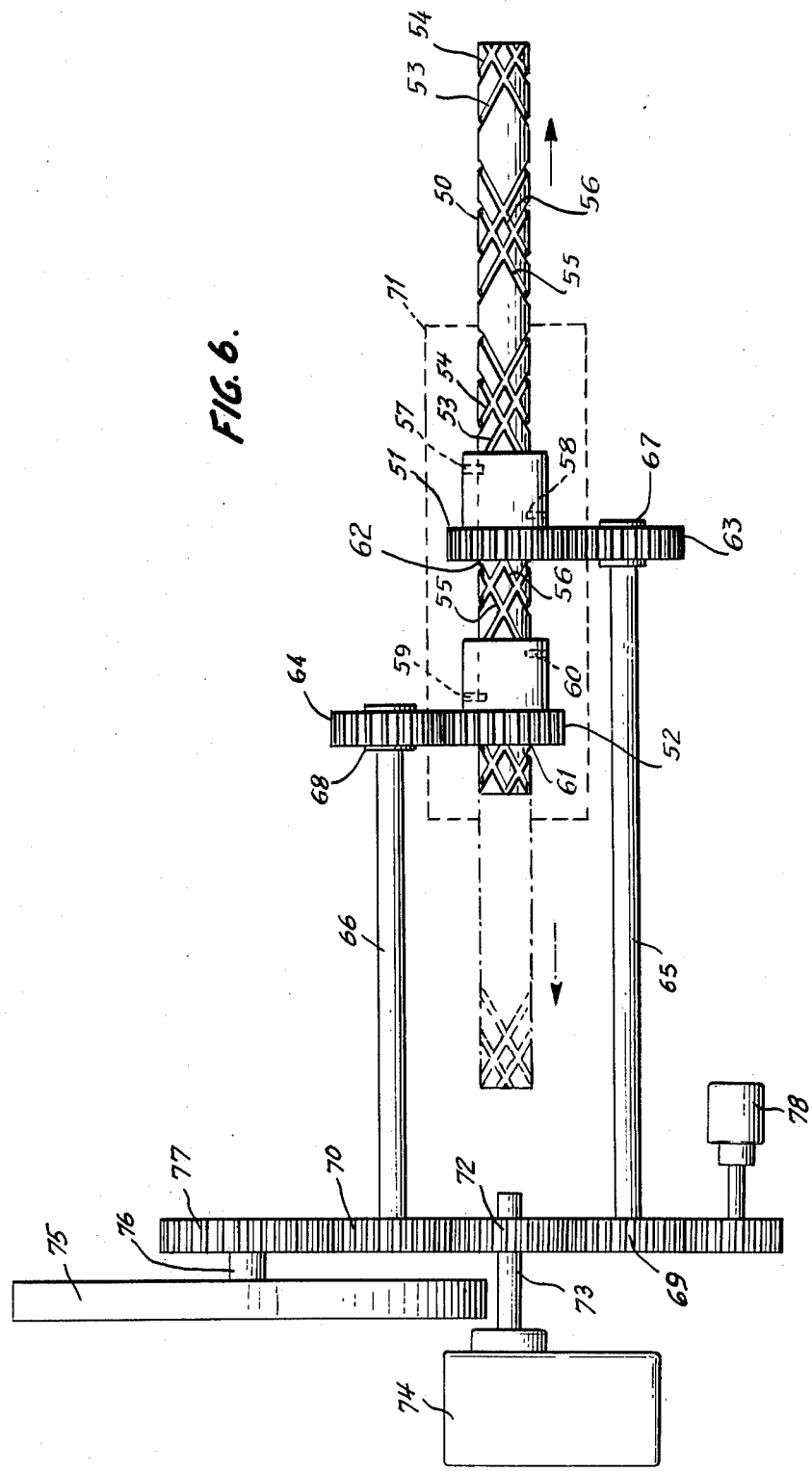
FIG. 6 is a plan view of an alternative embodiment of a conversion device.

Referring to FIG. 6, an alternate embodiment of the invention is shown. The device for converting linear reciprocal motion into continuous rotary motion comprises input shaft 50 which is movable in a reciprocating motion from the position shown in solid lines to the position shown in phantom. Input shaft 50 is not intended to rotate, but rather, forces drive gears 51 and 52 to rotate in an alternating motion. Input shaft 50 and gears 51 and 52 are retained in a housing 71 which is shown schematically in phantom. Drive gears 51 and 52 rotate in an opposite direction and the direction of rotation of the gears 51 and 52 reverses periodically. When the input shaft 50 is moved from the position shown in solid lines toward the position shown in phantom, drive gears 51 and 52 rotate in opposite directions; when input shaft 50 is withdrawn, the gears 51 and 52 reverse direction. Input shaft 50 includes on the surface thereof four helical grooves 53, 54, 55 and 56, two right-handed grooves 53 and 54 and two left-handed grooves 55 and 56 which receive, respectively, pins 57 and 58 and pins 59 and 60. Each gear 51 and 52 includes a central bore 61 and 62, each bore having two pins protruding radially inwardly into the associated helical groove. The boundary walls of each helical groove engage the associated pin and rotate the drive gear when drive shaft 50 is moved.

Drive gears 51 and 52 mesh respectively with driven gears 63 and 64. Driven gears 63 and 64 are mounted on driven shafts 65 and 66 by one-way clutches 67 and 68 which are of the type shown in FIGS. 4 and 5. During one stroke of the reciprocating movement of input shaft 50, one clutch engages and the other clutch disengages and slips; during the other stroke of the reciprocating movement, the first clutch disengages and slips and the second clutch engages. Driven gears 69 and 70 are mounted on driven shafts 65 and 66 and turn in the opposite directions. Gears 69 and 70 may be connected via intermediate gear 72 which is mounted on output shaft 73. Output shaft 73 may be used to drive electrical generator 74. In order to allow for storage of energy and reduce the magnitude of fluctuations in the speed of the output shaft, flywheel 75 is connected via flywheel shaft 76 and driven gear 77 to driven gear 70. Optionally, a supplemental motor 78 of the type described with respect to FIG. 1 may be included in the conversion device shown in FIG. 6 and is connected to gear 69.

It should be understood that although specific embodiments of the invention have been described herein in detail, such description is for purposes of illustration only and modifications may be made thereto by those skilled in the art within the scope of the invention.

What is claimed is:

1. A device for converting reciprocal linear motion to continuous rotary motion of an output shaft, the device comprising:
    an input member movable in a reciprocal linear motion and having a forward stroke in a first linear direction and a backward stroke in a second linear direction opposite said first linear direction;
    a drive member rotatable in a first direction and a second direction opposite said first direction;
    linear motion converter means for rotating said drive member in an alternating rotary motion, said converter means rotating said drive member in said first direction in response to movement of said input member in said first linear direction and rotating said drive member in said second direction in response to movement of said input member in said linear direction opposite the first linear direction;
    a first gear coupled to said drive member by first one-way clutch means, said first clutch means engaging and rotating said first gear when the drive member is rotated in said first direction and disengaging and slipping with respect to said drive member when said drive member is rotated in said second direction;
    a second gear coupled to said drive member by second one-way clutch means, said second clutch means disengaging and slipping with respect to said drive member when said drive member is rotated in said first direction and engaging and rotating said second gear when said drive member is rotated in said second direction;
    driven shaft means rotatable in one direction, said driven shaft means having mounted thereon flywheel means for stabilizing the rotational speed of said driven shaft means and for storing energy;
    gearing means connecting both said first and said second gears to one of said driven shaft means and said output shaft, and connecting the other of said driven shaft means and said output shaft to only said first gear, to provide for rotation of said driven shaft means, said output shaft and said flywheel and for returning the stored energy from the flywheel to the output shaft thereby reducing the amount of input energy needed to rotate the output shaft.

2. A conversion device according to claim 1 wherein said drive member comprises a drive shaft and wherein said linear motion converter means comprises a helical groove on the surface of said drive shaft and said input member includes pin means positioned within said helical groove.

3. A conversion device according to claim 2 wherein said gearing means for connecting said first and second drive gears to said driven shaft means comprises two driven gears mounted on said driven shaft, one of said driven gears engaging said first gear, the second driven gear engaging an intermediate driven gear, said intermediate driven gear engaging said second gear.

4. A conversion device according to claim 3 and further including an additional gear engaging said first driven gear, said additional driven gear allowing for the application of supplemental power for rotating said driven shaft and said output shaft.

5. A conversion device according to claim 1 and further including an electrical generation means, said electrical generation means connected to said output shaft to provide for the generation of electrical power.

6. A conversion device according to claim 1, wherein said input member comprises a drive shaft, and wherein said linear motion converter means comprises at least one right handed helical groove and at least one left handed helical groove on the surface of said drive shaft, said drive member comprises a pair of spaced apart drive gears each having a central bore with an inwardly directed pin means in each bore with each respective pin means positioned within a corresponding one of said helical grooves, a first driven gear engaging one of said drive gears and a second driven gear engaging the other of said drive gears, first and second coupling shafts, said first driven gear coupled to said first coupling shaft through said first clutch means and said second driven gear coupled to said second coupling shaft through said second clutch means, and wherein said first gear is directly mounted on said first coupling shaft and said second gear is directly mounted on said second coupling shaft.

7. A conversion device according to claim 6, wherein said gearing means comprises an intermediate gear mounted on said output shaft and engaging both said first and second gears, and a flywheel gear mounted on said driven shaft and engaging said first gear.

8. A conversion device according to claim 1, wherein said gearing means comprises first and second driven gears mounted on said driven shaft, and an intermediate gear, said first driven gear directly engaging said first gear, said second driven gear engaging said second gear through said intermediate gear, and an output gear mounted on said output shaft and engaging said first gear.

* * * * *